United States Patent [19]

Fleer et al.

[11] 4,267,429
[45] May 12, 1981

[54] APPARATUS FOR ACTIVATING SHOE ASSEMBLY CEMENT

[75] Inventors: Thomas P. Fleer, Sunset Hills; Reed E. Hannebaum, Oakville, both of Mo.

[73] Assignee: Brown Group, Inc., St. Louis, Mo.

[21] Appl. No.: 18,650

[22] Filed: Mar. 8, 1979

[51] Int. Cl.³ ............................................. H43D 25/20
[52] U.S. Cl. ..................................... 219/215; 219/411
[58] Field of Search ....................... 219/215, 411, 354; 156/320, 322, 306

[56] References Cited

U.S. PATENT DOCUMENTS

| Re. 24,296 | 3/1957 | Stewart | 219/405 |
|---|---|---|---|
| 2,249,760 | 7/1941 | Harrison et al. | 219/215 |
| 2,672,545 | 3/1954 | Alderman et al. | 219/215 |
| 2,694,131 | 11/1954 | Carson | 219/215 |
| 3,072,774 | 1/1963 | Larsen et al. | 219/411 |
| 3,232,813 | 2/1966 | Newton | 156/322 |
| 3,236,998 | 2/1966 | Wertheimer et al. | 219/405 |
| 3,256,421 | 6/1966 | Card | 219/215 |
| 3,486,004 | 12/1969 | Morrone | 219/85 BA |
| 3,517,160 | 6/1970 | Maga | 219/215 |

OTHER PUBLICATIONS

Compo, Timed Flash Activator, Compo Industries, Brochure, 1975.
American Flash Activator Model A Brochure, American Shoe Machinery Corp. #Undated.
Profile Brochure, Process Equipment Developments, 1976.

*Primary Examiner*—Elliot Goldberg
*Assistant Examiner*—Bernard Roskoski
*Attorney, Agent, or Firm*—Gravely, Lieder & Woodruff

[57] ABSTRACT

Apparatus for flash activation of the cement employed in the assembly of shoes comprising supports for positioning shoe components adjacent a source of heat, controls for energizing the source of heat in accordance with a predetermined schedule to accommodate interruptions in the flow of components through the apparatus by incorporating reheat cycles to maintain cement activation during interruptions, the controls for permitting the apparatus to be operated in advance of processing shoe components to establish a desired temperature level in the apparatus prior to processing shoe components, and providing processor controls for regulating the operation of the apparatus in a manner to turn out shoe components with properly activated cement on surfaces intended to be joined in assembly of completed shoes.

9 Claims, 13 Drawing Figures

APPARATUS FOR ACTIVATING SHOE ASSEMBLY CEMENT

BACKGROUND OF THE INVENTION

It is known in the shoe manufacturing industry that thermoplastic cements are utilized to join an outsole to the lasted upper. In the use of such cements, the solvent must be allowed to evaporate so the parts can be handled easily and thus avoid the chance of sticking together before the desired alignment is made. When the shoe parts are ready for assembly the cement is exposed to heat which causes it to soften and become tacky, whereupon the parts are aligned properly and clamped in a press while the cement cools below its softening point.

The most commonly used source of heat for activating the thermoplastic cement is developed from resistance type heating elements which heats the shoe parts primarily by convection. Cal rods are the most frequently used due to the favorable cost. Another common heating element is the glass panel or pyrex panel heating element in which low thermal expansion glass is made to have relatively low electrical resistance. When an EMF is impressed across the ends of the glass it becomes a large resistance heating surface so the shoe parts can be placed near by to activate the cement by both convection and conduction. The nature of the glass panel causes uneven heating in its surface area and that leads to uneven activation of the cement on the shoe parts.

In recent years, quartz lights have been used as the heating elements in outsole activators. These lights operate in the infrared energy range and develop temperature of the order of 3000° F. in about one second of operation. Quartz lights have low mass and can cool quickly when compared to the cool down time of other heating means. However, quartz lights have a high watt density and generally heat objects mostly by radiant energy.

Heating elements of the quartz light type have advantages in the application to activation of the thermoplastic cement used in the manufacture of shoes. These advantages are: operator comfort from lack of heat blast when removing shoe parts from the heating area; flash heating from the rapid rise in temperature which does not unduly heat the shoe parts on which the cement is placed, ability to use shoe materials having a low melting point and avoidance of operator judgment; reduction in the time shoe parts need to remain in a press which improves productivity and ultimate cost; and low thermal inertia which allows heat delivery quickly at a high temperature and rapid cool down at zero energy consumption.

Commercial equipment for heat activating cement in the manufacture of shoes shows a wide diversity in designs. A British Profile Activator has a single table top with the quartz lights above the outsole, while the lasted upper is heated by a Cal Rod over the upper. A Compo activator has quartz lights in a chamber and a shuttle for moving the outsole into the chamber, while the uppers are Cal Rod heated on top of the chamber. American Shoe Machinery Activator is provided with two banks of quartz lights located beneath the outsole and the upper. A light shield protects the eyes of the operator, and a control activates both banks during the heating cycle.

BRIEF DESCRIPTION OF THE INVENTION

This invention relates to improvements in obtaining the flash activation of the cement applied to shoe components just prior to the final assembly thereof.

The objects of this invention are to provide a cabinet structure that is capable of improving the heat retention for more uniform cement activation, to control the application of the activation heat so the cement is properly activated without heating the shoe components, to provide a control system which will accommodate the activation of cement on outsoles and lasted uppers in a sequence that embodies safety provisions to prevent overheating as well as warm up to establish a substantially steady thermostatic state, and to provide heating means selectively positionable for activating the breast areas of lasted uppers having high heels.

Further objects and the advantages of the present invention will be more particularly set forth in the following description.

BRIEF DESCRIPTION OF THE DRAWINGS

A preferred embodiment of the present invention is illustrated in the accompanying drawings, wherein.

DETAILED DESCRIPTION OF THE APPARATUS

Figure 1:
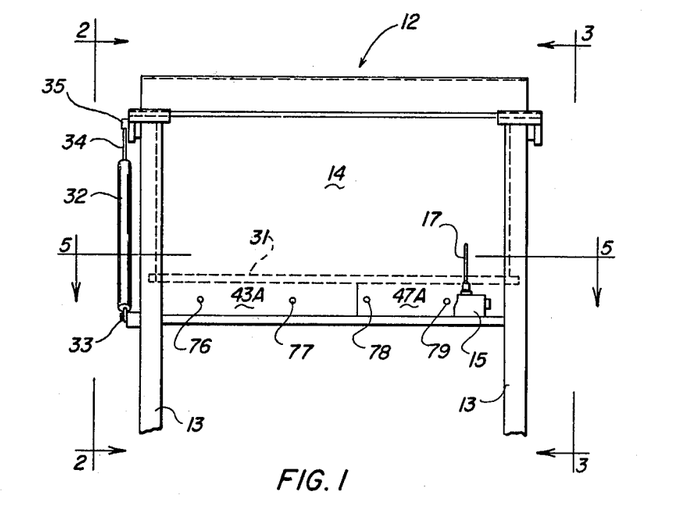
FIG. 1 is a front elevation view of the apparatus with the operator shield in closed position.
Figure 2:
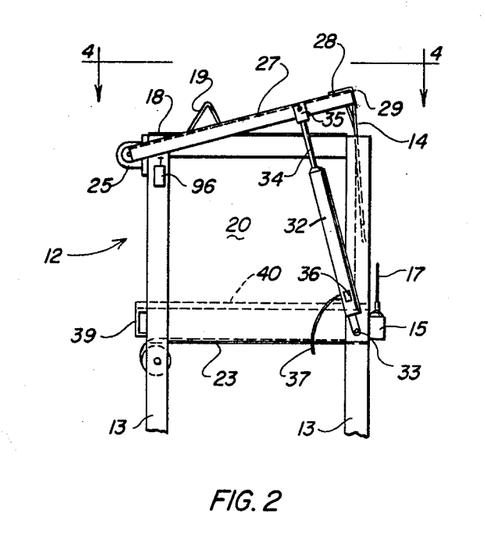
FIG. 2 is a left side elevation view of the apparatus taken at line 2—2 in FIG. 1 showing the operator shield in partially raised position.
Figure 3:
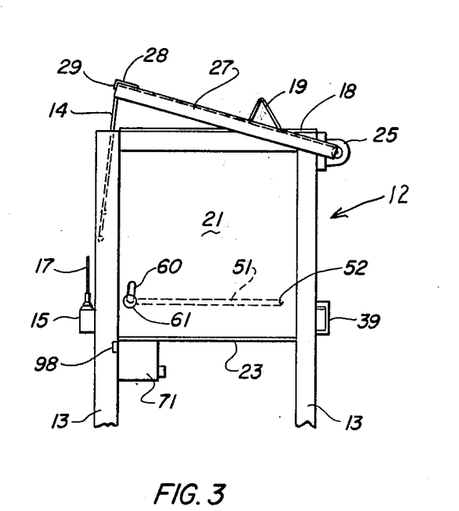
FIG. 3 is a view taken along line 3—3 in FIG. 1 showing the right side of the apparatus.

In the following description a presently preferred embodiment of apparatus will be set forth, but it should be understood that structural variations may be made without departing in any essential characteristics from those shown in the drawings. Referring now to FIGS. 1, 2 and 3 the apparatus 12 comprises a suitable housing supported on legs 13 so as to position the working area at a desired elevation from the shop floor. FIG. 1 shows the housing from the front with a suitable light stopping flexible or fabric shield 14 in its down or closed position so as to shield the glare of the quartz lamps from the operator's eyes. A start switch 15 is mounted at the front of the housing in position so that its flexible arm 17 projects into a position where it may be actuated by the operator either by hand or by knocking the arm 17 with a shoe component. It can be seen in FIGS. 2, 3 and 4 that the housing is provided with a cover 18 formed with a raised portion 19 which constitutes a vent opening at its opposite ends for the escape of heat. The left end of the housing is closed by a wall panel 20 as seen in FIG. 2 and the right end of the housing is closed by a wall panel 21 as seen in FIG. 3. These walls 20 and 21 are also shown in FIG. 5, together with a back wall panel 22. These side and back walls, and the cover 18 cooperate with a bottom pan 23 to form the enclosure for the operating area of the housing. The shield 14 constitutes the movable wall for the housing and permits the introduction and extraction of shoe components.

Figure 4:
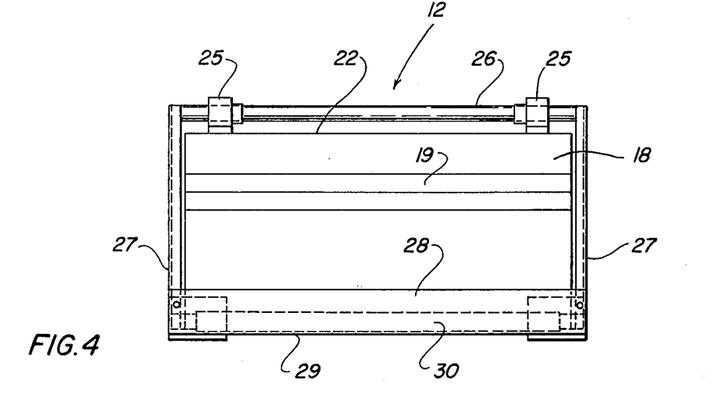
FIG. 4 is a top plan view of the apparatus of FIG. 2 as seen along the line 4—4 in FIG. 2.
Figure 5:
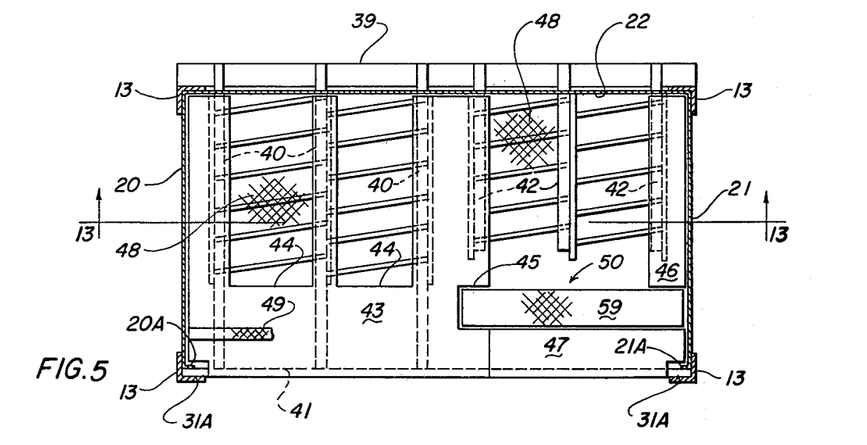
FIG. 5 is a sectional view taken along line 5—5 in FIG. 1 showing the arrangement of components inside of the apparatus, and with the supporting screen for the shoe components broken away to reveal details.

Turning now to FIG. 4, and with reference to FIGS. 2 and 3, there is shown a pair of pillow blocks 25 attached to the back wall 22 and near the upper margin thereof for the purpose of operatively supporting a shaft 26. The opposite ends of the shaft project beyond the end walls 20 and 21 so as to support the side arms 27 of a frame in which the side arms 27 are interconnected by a panel 28 having a flange 29 formed on its front edge. As seen in FIGS. 2, 3 and 4 the side arms 27 are located outside of the side walls 20 and 21, thereby permitting the panel 28 to rest on the cover 18 when the shield 14 is in the closed position. The shield is somewhat shorter than the length of the panel 28 so as to permit the appropriate mounting of the supporting rod 30 for the shield 14 in the frame side arms 27, and further to permit a rod 31 in the bottom edge of the shield 14 to ride in channel 31A (FIG. 5) formed between the in-turned flange of the upper portion of the two front legs 13 and the in-turned flanges 20A and 21A on the adjacent side panels 20 and 21 respectively. The exposed ends of the rod 31 (FIG. 1) project into these guide channels, and the weight of the rod is selected so that it will create a desired tension or pull on the shield 14 which is made from flexible heat resistent fabric.

It is seen in FIG. 2 that the frame is movable between raised and lowered position through the operation of a fluid pressure cylinder 32 having its base mounted in a suitable pivot 33 so that its piston rod 34 will project upwardly and be connected to one of the side arms 27 through clevis 35. The cylinder 32 is provided with a pressure fluid control valve 36 supplied by conduit 37 from a suitable source of pressure fluid. The cylinder has an internal spring (not seen) that forces the rod 34 to pull the curtain 14 into closed position when the valve 36 functions to allow the escape of pressure fluid during closing of the curtain 14. The pressure fluid may be air. Opening of the curtain is effected by actuating the valve 36 to admit pressure fluid to the cylinder 32 at sufficient pressure to overcome the internal spring.

In FIG. 5 it can be seen that the interior of the housing for the apparatus 12 is provided with a suitable wire race 39 carried by the back legs 13 of the frame. The race 39 forms support for the rear end portions of a series of bars. Certain of the bars 40 extend to the frame member 41, and others of the bars 42 extend part way so as to leave a gap space between the ends thereof and the front frame member 41. These bars 40 and 42 are supports for a cover plate 43 formed with cut-outs 44 and a notch 45. A further cover plate 46 is carried by the end most bar 42, and a front cover 47 extends from the notch 45 in cover 43 to the right side of the frame. The covers 43 and 47 each have a front down turned flange 43A and 47A. The panel 47A supports the switch 15 as seen in FIG. 1. An expanded metal screen 48, only partly shown, fits over the covers 43, 46 and 47 so as to extend over the spaced formed by cut-outs 44 and the space left open between covers 43 and 46 in the areas of bars 42. The screen 48 is formed with a raised rib 49 which extends across the width of the frame and in front of the notch 45 in cover 43. The rib 49 is to locate the shoe components relative to the lamps 65 and when the assembly 50 is retracted.

Figure 6:
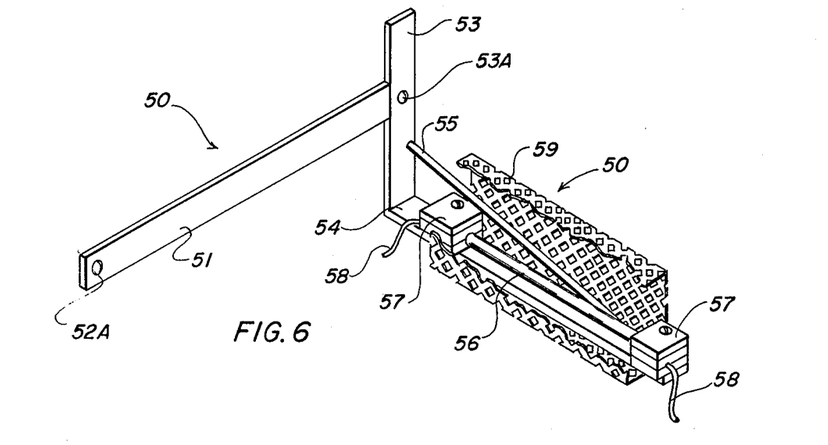
FIG. 6 is a perspective view of the means to support and position the heat source for effecting flash activation of the cement in the breast area for high heeled shoes, the guard for the heat source being shown in fragmentary section.

FIGS. 5 and 6 disclose a movable lamp assembly 50 which, in FIG. 5, is seen to be positioned adjacent cover 47 so that one end fits in the notch 45 of cover 43 and the opposite end fits between covers 46 and 47. This assembly 50 is movable between positions with its upper surface substantially in the plane of the screen 48 or in a raised position. The details of the assembly are seen in FIG. 6, with some reference being made to FIG. 3. An operating arm 51 has its rear end mounted on a pivot 52 carried in end wall 21. The arm 51 extends forwardly to connect with a vertical member 53. The member 53 has a portion of its length projecting below arm 51, and the lower end is connected to a support member 54 which projects at right angles to the member 53 so as to lie along the bottom of the lamp assembly 50 (FIG. 5). The member 54 is stabilized by a brace 55. The lamp assembly includes a quartz lamp 56 carried at its ends on insulator blocks 57 which are mounted on the member 54. Suitable lengths of electrical leads 58 are provided so as to accommodate the travel of the lamp assembly. The lamp 56 is located in an expanded metal guard 59 which is sized to occupy the space provided for the assembly 50, as seen in FIG. 5.

As can be seen in FIGS. 3 and 6, the arm 51 is disposed adjacent the inside surface of the frame end wall 21 so that the pivot 52 will engage in the hole 52A of that arm. The forward end of arm 51 is connected to the vertical member 53, and that member 53 is provided with a threaded aperture 53A which is aligned with an arcuate slot 60 in wall 21. A clamp element 61 having a threaded shaft which extends through the slot 60 engages in threaded hole 53A which is provided to position the assembly 50. When the clamp element 61 is tightened by hand it draws arm 51 and member 53 against the surface of wall 21 to frictionally retain the lamp assembly 50 in either its raised or lower position. When secured in its raised position the assembly 50 is raised above the plane of the screen 48 so that the heat from the lamp 56 will reach the breast area of a high heel.

Figure 7:
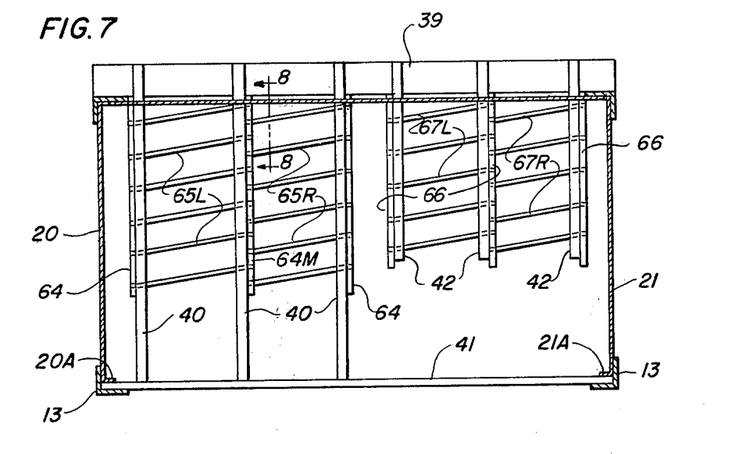
FIG. 7 is a view similar to FIG. 5 for particularly showing the arrangement of the flash activation quartz heating lamps.
Figure 8:
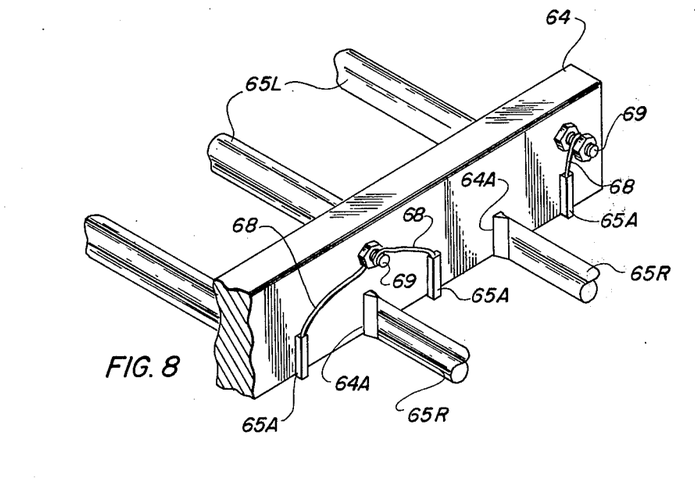
FIG. 8 is a fragmentary perspective view taken at line 8—8 in FIG. 7 showing a typical arrangement for supporting the quartz lamps.

The assembly of quartz lamps is best seen in FIGS. 7 and 8. The frame structure of the apparatus, as previously noted, includes the wire race 39 which functions also as the primary support for the bars 40 and 42. In FIG. 7, the bars 40 carry transite insulation blocks 64, and a plurality of quartz lamps 65 are mounted in these blocks 64 at suitable angles such that the middle one of the blocks 64M is able to receive the ends of all of the lamps 65. In the example shown, there are two banks of lamps 65L and 65R with six lamps in each bank. As shown in FIG. 5 when the cover 43 is placed in position the bars 40 and insulation blocks 64 are hidden. This leaves only the bodies of the lamps 65L and 65R exposed in the notches 44.

In like manner, the bars 42 carry transite insulation blocks 66, and a plurality of quartz lamps 67L and 67R are mounted in them with the middle block supporting the ends of all of the lamps in manner depicted in FIG. 8. There are two banks of lamps 67 with five lamps in each bank. Each of the insulation blocks 66 and their supporting bars 42 are hidden below cover 43 and 46 (see FIG. 5). The middle bar 42 and the insulation block 66 carried by it are left uncovered, but may be covered if necessary. It is seen in FIG. 7 that the banks of lamps 67 do not extend all the way to the front frame member 41. This is done so there will be a space to receive the movable lamp assembly 50 which carries a quartz lamp 56 directed at right angles to the bars 42.

FIG. 8 illustrates a typical mounting of the end portions of the quartz lamps in the middle transite insulation block 64M. It is typical of the lamps that the ends are flattened and carry contact caps 65A. The insulation block 64 is formed with slots 64A to receive the flattened caps 65A. Electrical leads 68 are secured to the caps 65A and are run to suitable terminals 69 where circuit leads (not shown) can be run along the bars 40 into the wire chase 39. The lamp mounting provision seen in FIG. 8 is also typical of the arrangement for the lamps 67R and 67L.

Figure 13:
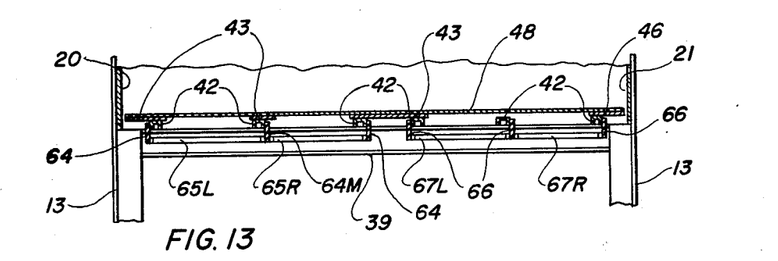
FIG. 13 is a fragmentary sectional view of the support means for the shoe components and the heat source disposed beneath the support means, as seen along line 13—13 in FIG. 5.

FIG. 13 illustrates the relationship of the expanded metal screen 48 positioned on top of the cover plate 43 and cover plate 46, these cover plates being shown to advantage in FIG. 5 in plan view. The bars 42 are used to support the cover plates 43 and 46, as well as to support the insulation blocks 64 and 64M for the quartz lamps 65L and 65R, and to support the insulation blocks 66 for the quartz lamps 67L and 67R. The insulation blocks extend below the bars 42 so the quartz lamps will have sufficient clearance to extend between the blocks and across the spaces 44 in cover plate 43, and across the open area (FIG. 5) behind the front cover 47 adjacent the movable lamp assembly 50.

CONTROL SYSTEM

The foregoing flash activator apparatus is provided with a control system that effects an automatic response for optimum results in the activation of the thermoplastic cement used to secure outsoles to lasted uppers. The control system will be described in connection with flash activator apparatus having two banks of lamps for the outsoles and two banks of lamps for the lasted uppers, the concept being that the banks of lamps may be alternated to provide more economical production with improved results.

Figure 9:
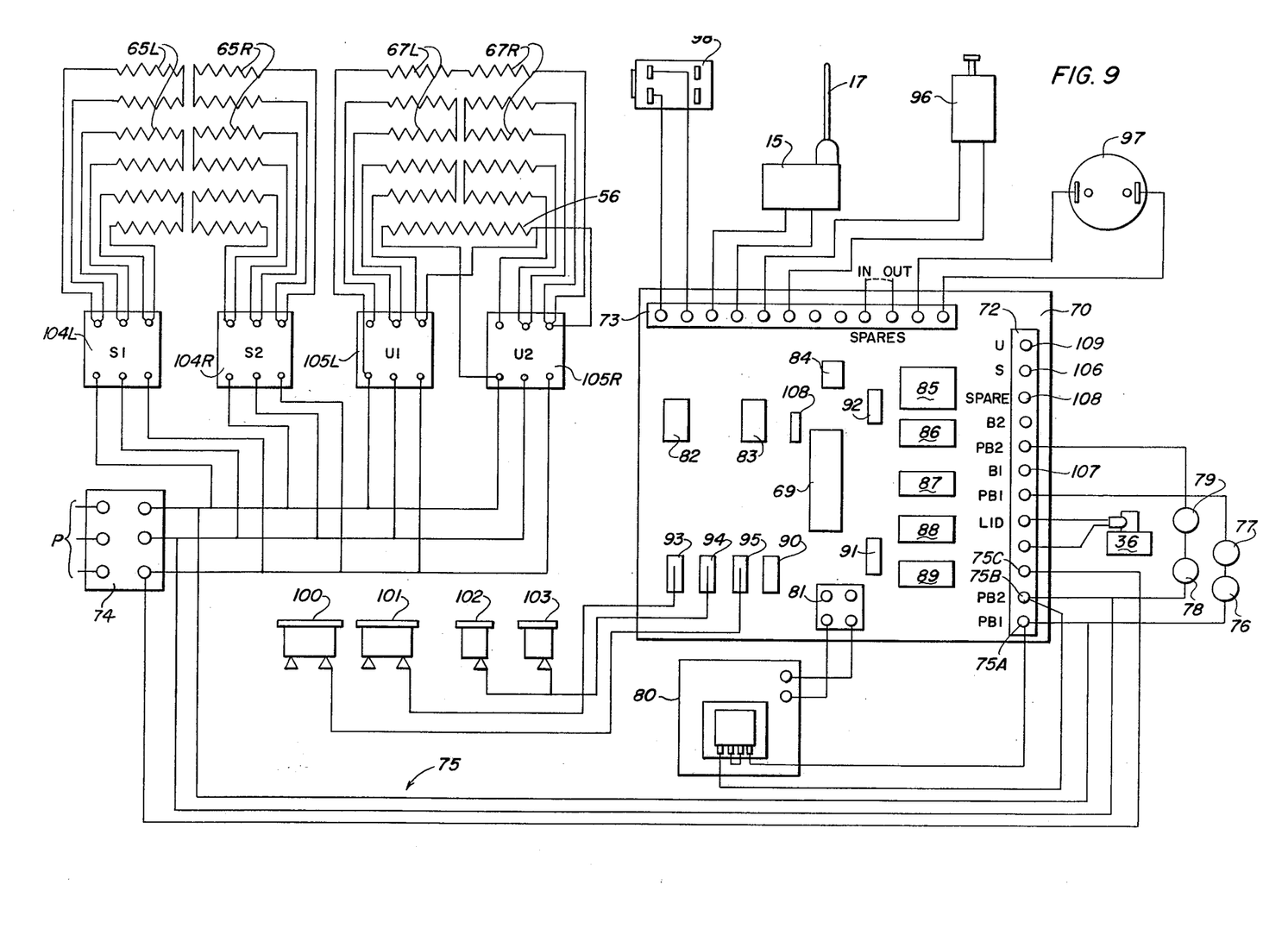
FIG. 9 is a general diagram of the microprocessor controlled electrical system associated with the apparatus of FIG. 1.

FIG. 9 is a diagrammatic presentation of the control system in which a microprocessor 69 is employed to run the system. The mounting board 70 for the microprocessor 69 is carried in a suitable box 71 (FIG. 3) at the right end of the assembly, and suitable leads from operating components located at various places are directed into that box 71. The board 70 is used to support suitable power strip 72 and control strip 73. A source P of three phase and 230 volt power is connected into the AC power supply connector block 74 at box 71. Leads 75 are brought to the contacts 75A, 75B and 75C on the power strip 72 so that various components will be supplied through contacts on that strip. For example, the solenoid valve 36 for operating the curtain 14 which is part of the lid is wired into the power strip 72. It can be seen in FIG. 1 that there are pointer lights 76 and 77 located on the front flange 43A of cover 43 and pointer lights 78 and 79 located on the adjacent front flange 47A of cover 47. These lights are aligned with the banks of lamps, such that lights 76 and 77 are indicative of the respective left and right banks of lamps 65, while lights 78 and 79 are indicative of the respective left and right banks of lamps 67. In addition, the power from contacts 75A and 75B is conducted into a second power supply block 80 which furnishes five volt current into the terminal block 81 and then connections (not shown) are made to the components carried by the control board 70 in the usual manner.

The control board 70, in addition to the microprocessor 69, is provided with I/O terminators 82, 83, and 84, solid state relays 85, 86, 87, 88 and 89, quad NAND gate 90, quad AND gates 91 and 92, and connectors 93, 94 and 95. The control strip 73 on the board 70 provides the necessary connections for components such as the start switch 15, the lid actuated switch 96, the alarm device 97, and an abort switch 98. Time control thumb wheel devices are provided such that the reheat timer device 100 is wired to connector 95, the pause timer 101 is wired into connector 93, and the sole and upper timer 102 and the upper lead timer 103 are wired into connector 94.

Turning now to the quartz lamp hook-up to the control board 70, it is to be understood that each bank of lamps 65L and 65R is provided with its own connector block designated 104L and 104R respectively, and that the banks of lamps 67L and 67R have separate connector blocks designated 105L and 105R respectively. The lamp 56 in the movable lamp assembly 50 is wired across the blocks 105L and 105R in view of the special use of this lamp. By suitable leads (not shown) the bank of lamps 65L are connected into the power strip 72 at contacts 106 and 107. The bank of lamps 65R are connected into contacts 106 and 108 of the power strip 70. In like manner the bank of lamps 67L are connected into power strip contact 109 and 107, and the bank of lamps 67R are connected into contacts 109 and 108 of the power strip.

The primary object of the foregoing control arrangement is to regulate the ON and OFF sequence of the quartz lamps, the time of being ON, the time of pause between the lamp ON cycle, the selection of the left and right banks of lamps, and other characteristics such as the opening and closing of the shield 14, the sequence of the pointer lights 76 to 79 being ON and OFF, the purpose for an alarm 97 and for an abort switch 98. The several means described in connection with FIG. 9 have certain functions which will be set forth in the following description.

NORMAL ACTIVATION CYCLE

Figure 10:
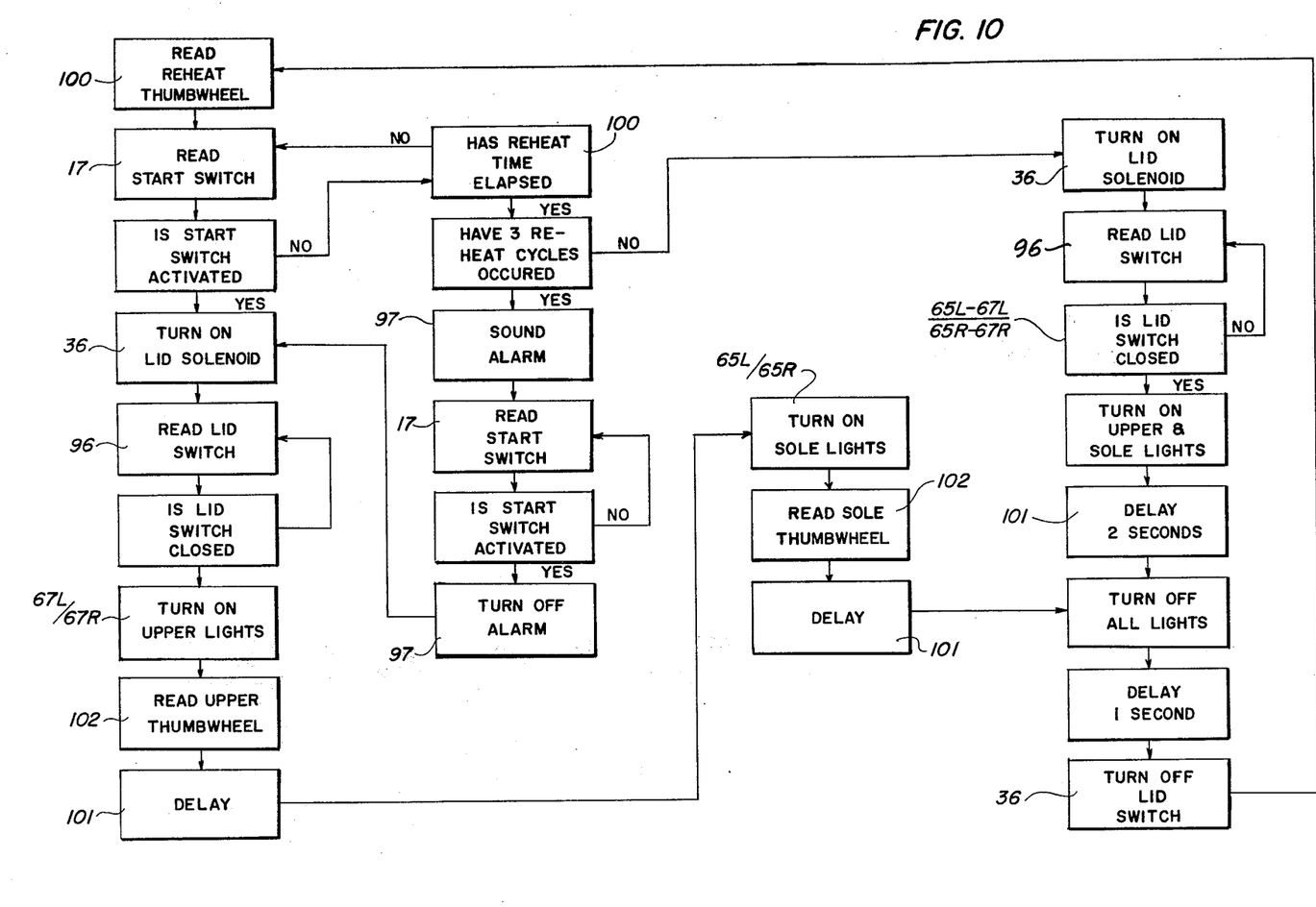
FIG. 10 is a flow diagram setting forth the sequence of operations programmed into the microprocessor.

Referring to FIGS. 9 and 10, the control system operates on an automatic series of steps affecting the periods of time the cement activation heat lamps 65, 67 and 56 are on and in which banks, left or right as indicated by the pointer lights 76 to 79, and the operation of the curtain to close before the lamps are energized as a protection for the operator. The operator starts the activation cycle by moving the start switch arm 17. That initiates a cycle in which the microprocessor 69 scans the sequence of operating steps to determine if the reheat thumbwheel 100 is in its first heat cycle and if the start switch 15 has been activated. The start switch being activated, the microprocessor will operate the solenoid valve 36 which will bleed the pressure fluid in the cylinder 32 and allow the internal spring to drive the piston down which lowers the frame 27 and drops the protective shield 14 so as to close the front of the apparatus. Any other suitable means, however, may be employed for operating the shield 14. The microprocessor will continually monitor the closing sequence to determine when the lid switch 96 has been closed so as to be sure that the shield 14 is in its down position. The next sequence of the microprocessor is to select one of the banks of lamps 67L or 67R, whichever one is next in sequence, for activating the thermoplastic cement on the lasted upper which has been placed in the apparatus over that bank of heat lamps 67L.

The control system moves into a "pause" time period which is determined by the pause thumbwheel 101 of a type having two digits so it can measure from zero to 99 seconds. The operator may dial in whatever desired pause time is wanted, and the control circuit will wait until the selected pause time period has elaspsed before the microprocessor 69 will function to turn on either bank of lamps 67L or 67R, whichever bank happens to be in that phase of the control sequence.

The next step will be that the microprocessor 69 will read the upper lead thumbwheel 103 to determine the time lamps 67L or 67R have to be on. Then the selected bank of lamps will be turned on. After the elapsed time indicated on the thumbwheel 103, lamps 65L or 65R will then be turned on. The microprocessor 69 will monitor the sole and upper thumbwheel 102 to determine the length of time the lamps 65L or 65R should be on, and when that on time period has elapsed the microprocessor will then move to the step of turning off all of the heat lamps which had been on up to that point. The next step would be to delay for one-half second to allow the lamps to cool which is determined by a built-in clock in the microprocessor, and at the end of that time the solenoid 36 will be activated to supply pressure fluid through conduit 37 to raise the shield 14 through the action of the cylinder 32. When the shield has reached its fully open position, the microprocessor will then return to the start of the normal cycle which has just been described.

It is noted that in the foregoing cycle of events a lasted upper and an outsole will have been heat activated by the left hand bank of lamps 65L and 67L. During this heat activation cycle the pointer lights 76 and 78 will be on. When the shield 14 is fully open a suitable circuit will be energized to extinguish the pointer lights 76 and 78 and switch on the pointer lights 77 and 79 to indicate to the operator that the right hand bank of lamps 65R and 67R are to be used next. An outsole and a lasted upper should be inserted over the right hand bank of heat lamps, and the activated sole and upper should be withdrawn. In making this switch of shoe parts the operator should strike the switch arm 17 which will then start a renewed normal cycle of operation in accordance with the foregoing description. It should now be understood that the left and right banks of lamps are used alternately, and the banks of lamps are not energized simultaneously so as to limit the current draw to keep it within safe operating levels.

When it is desired, in the normal cycle, to heat activate the thermoplastic cement applied to the breast area of a lasted high heel upper, the operator will release the clamp means 61 (FIG. 3) and raise the movable lamp assembly 50 so that the arm 51 is at the top of the slot 60 where the clamp means 61 can be tightened up to retain the lamp assembly 50 in its elevated position. It is not necessary in all cases to move the arm 51 to the full extent of the slot 60, as the amount of elevation of the lamp assembly 50 will be normally governed by the length of the heel breast to be activated.

ABORT MODE

The Abort Mode for the present apparatus can be initiated at anytime during the operating cycle by opening the abort switch 98. In the abort mode, the control system turns off the then activated lamps 65 or 67, turns off the alarm 97, if it is on, and raises the shield 14 if it is closed. It then selects the other bank of lamps, and also starts the internal timer (to be described later), and monitors the start switch 15. At this point, however, it will not allow the use of a reheat cycle, but instead will continue to monitor the start switch 15 until it is closed. Upon the closing of the start switch 15, the control system will perform a normal activation cycle.

REHEAT CYCLE

Turning, now, to consideration of the system to effect reheating of the cement, during normal operation, the following steps take place. If the start switch 15 is not activated within the reheat time indicated on the reheat thumbwheel 100, the microprocessor 69 will automatically initiate a reheat cycle. Failure to activate the start switch 15 by the operator within whatever time period has been selected, the sequence of operation is automatically begun by closing the shield 14 so that the lamps last energized will go into a reheat cycle and be reenergized. In this reheat cycle both the lamps 65 and 67 (either right or left banks thereof) will be turned on simultaneously for a period of two seconds. The microprocessor 69 will then shut off these lamps and wait one-half second before lifting the shield. When the reheat thumbwheel 100 is again monitored, if there is still a second delay in operating the start switch 15, the reheat cycle will again be repeated by the shield 14 being closed before the same two banks of lamps are energized. This particular repetitive operation for reheat is shown in FIG. 10 and is provided to take care of certain unavoidable delays which might permit the thermoplastic cement to cool down below a desired temperature level. On the other hand, if the reheat cycles, and there are as many as three reheat cycles involved, are completed without the start switch 15 being activated, the end of the third reheat cycle and the start of the fourth reheat cycle will initiate a circuit to energize the alarm 97 to indicate that the apparatus has completed the programmed three reheat cycles and the operator has not responded in a timely manner. The control circuit is so set up that the alarm 97 can be defeated or overridden at this point by hitting the start switch arm 17 which will automatically cause the control circuit through the microprocessor 69 to go into a normal activation cycle, or if that is not desired the abort switch 98 should be hit to shut off the alarm and allow the apparatus to cease functioning.

Certain safety precautions have been programmed into the circuit so that if the start switch 15 happens to lock in a closed position during an activation thereof, or if the operator holds the start switch arm 17 in its switch closed position, the control circuit will sound the alarm 97 when the activation cycle has been completed. The alarm will be activated because at this point when the shield 14 is raised while the start switch is held in its closed position the circuit will energize the alarm for one second and will then switch the circuits to illuminate the appropriate pointer lights 76 through 79, depending on which bank of lamps is then in operation, and will then sound the alarm for another one second period. This switching back and forth of the lights 76 through 79 will continue and at the same time the alarm will sound for one second intervals. This particular safety feature is provided to indicate that there may be a failure in the start switch 17 which would call for its replacement. The same alarm sequence is obtained if the lid switch 96 should happen to stick or lock in the normally closed position, and the alarm can only be shut off by hitting the abort switch 98.

EXTENDED ACTIVATION

Figure 11:
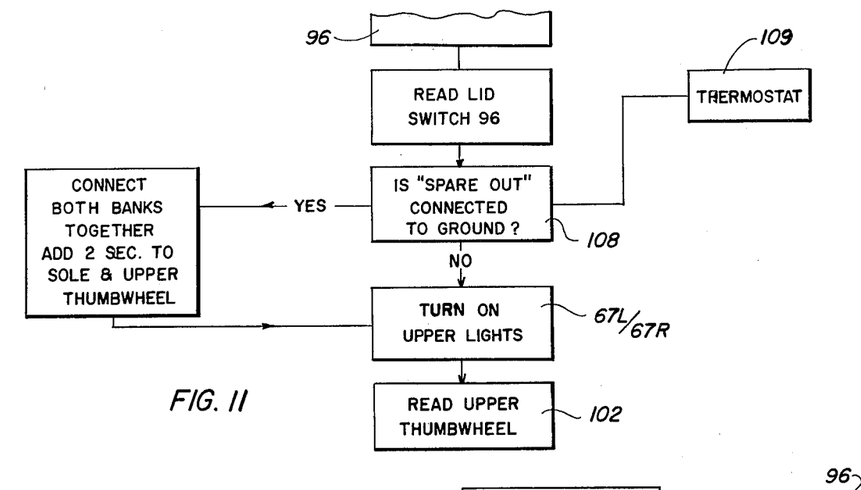
FIG. 11 is a flow diagram for temperature controlled activation of the heating elements for preoperation warm up.

The present apparatus is provided with means for bringing the housing 12 up to a satisfactory internal temperature so that the flash activation of the cement will be carried out to permit the proper joining of the outsoles and lasted uppers. Reference will now be directed to FIG. 11 which illustrates a flow diagram which will permit temperature controlled extended activation of the quartz heating lamps 65, 67 and 56. The flow diagram has omitted much of the disclosure of FIG. 10 since it is directed to a system connected into the latter flow diagram between the monitoring of the lid switch 96 and the activation of the heating elements. The microprocessor board 70 is provided with a suitable contact 108 which is connected to a thermostat 109 located at a suitable place in the housing 12. The thermostat has normally closed contacts when the internal temperature of the housing is below a desired level. When the thermostat is not satisfied because the housing is not up to desired temperature, the circuit through the contact 108 will be grounded and thus, whenever the start switch is closed, permits the microprocessor 69 to automatically turn on both banks of heating elements in order to elevate the housing temperature until the thermostat is satisfied. In addition the heating elements remain on two seconds longer than the time indicated by thumbwheel 102. When the temperature is up to requirements the thermostat will open its contacts and the system will revert to the operation set forth in the flow diagram of FIG. 10. Thus, the microprocessor 69 will monitor the condition of the contact 108 to determine whether it is grounded or not. If the contact 108 is not grounded the microprocessor will then go into its normal cycle of activating the left or right heating elements 67, followed by the activation of the companion left or right heating elements 65.

Figure 12:
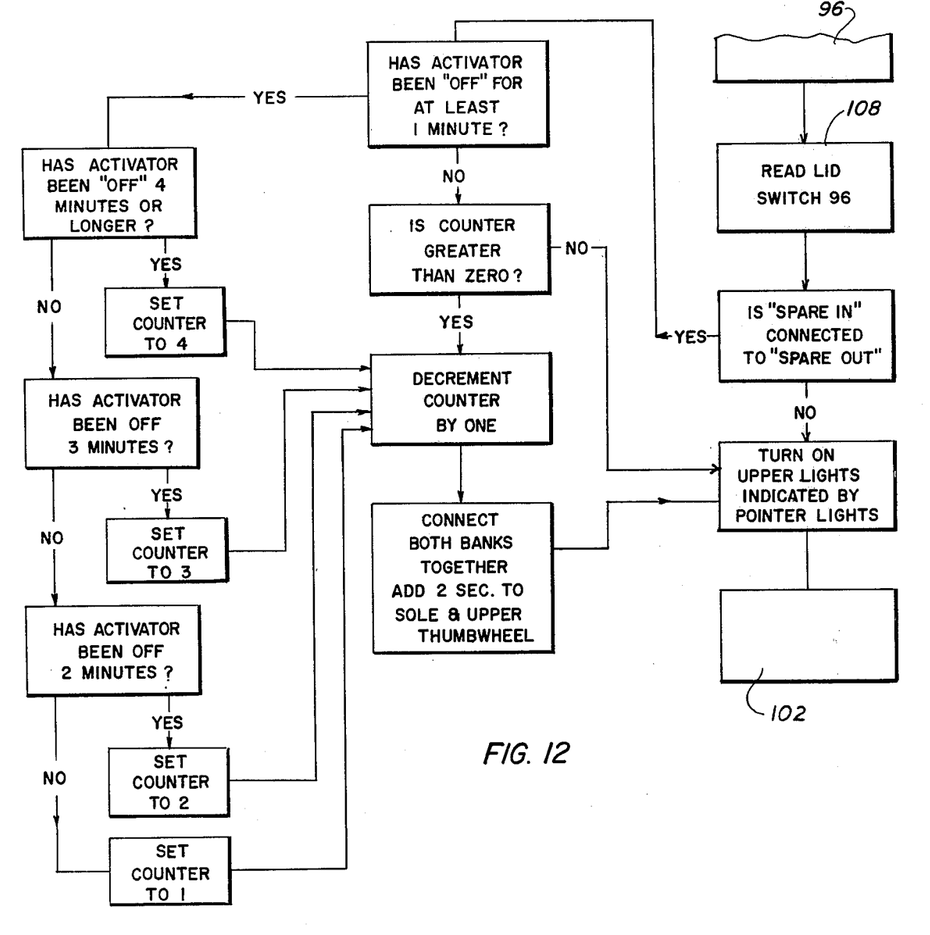
FIG. 12 is an alternate flow diagram for control over the heating elements for preoperation warm up.

The flow diagram of FIG. 12 does not embody a thermostatic element, but the extended activation cycle is initiated at the same place in the flow diagram of FIG. 10 as is the temperature controlled extended activation cycle of FIG. 11. In FIG. 12 the microprocessor 69 will monitor the grounded condition of contact 109, but in this case it will determine whether the contact 109 is jumper connected to contact 108 and then to ground. If the jumper contact set up in this manner is not grounded the flow diagram described in connection with FIG. 10 will be activated. On the other hand, if the contact 109 is grounded to contact 108 the system will then perform an extended activation cycle in which the microprocessor 69 will determine if the heat lamps have been off for at least a pause period of one minute. If that is a true condition the next step would be for the microprocessor to determine if the heat lamps have been off four minutes or longer. It is important to understand that if the apparatus has been allowed to stand without the heat lamps being on at any time for a period of four minutes it is presumed that the temperature in the housing 12 has fallen below the desired level to produce acceptable flash activation of the cement. If the four minute off period has not been reached the microprocessor 69 will then determine whether the apparatus has been off for a period of three minutes, and if that is not the case then the microprocessor will determine if the off period has been two minutes, and finally will determine if the pause period has been down to one minute. In these progressive samplings of the off period of the heat lamps, if the microprocessor gets a yes signal at the four minute time period it will carry the system through the steps necessary to turn on the heat lamps for the necessary time to restore the proper operating temperature, and in that way the extended activation period, having all of the heat lamps on simultaneously, will be progressively measured by the microprocessor so that the heat lamps will be activated to accelerate heating the housing to the proper operating temperature.

SUMMARY

The operator starts the normal activation cycle by closing the start switch 15. The control system responds to this by turning on the solenoid valve 36 that will lower the shield 14. The control system waits for the shield to close, which is indicated by the closing of the shield switch 96. The control system now selects a bank of heat lamps 67L or 67R. The control system now reads the setting on the PAUSE thumbwheel 101 and delays that length of time. Once the delay for the pause has elapsed, the control system turns on the bank of heat lamps 67L or 67R that heat the upper. Then the control system reads the UPPER LEAD thumbwheel 103 and delays that length of time. Next, the bank of heat lamps 65L or 65R that heat the SOLE is turned on, and the UPPER and SOLE thumbwheel 102 is read, and the control system delays the prescribed length of time. Afer this delay, the control system turns off all the heat lamps. After waiting one-half second for the lamps to cool, the control system raises the shield.

After the completion of an activation cycle the control system will determine if a reheat cycle is needed by reading the REHEAT thumbwheel 100. The control system then monitors the start switch 15 for another activation cycle. If, however, the start switch 15 is not closed within the time interval indicated by the reheat thumbwheel 100, the control system will perform a reheat cycle. The reheat cycle includes closing the shield 14 and waiting for the shield switch 96 to close. Then it immediately turns on both banks of lamps for the lasted upper and outsole then in the housing. After two seconds, it turns off the lamps, waits one-half second to allow the lamps to cool, and then raises the shield 14. The control system then reads the reheat thumbwheel 100 and then monitors the start switch 15. The system will again perform a reheat cycle if the start switch 15 is not closed within the prescribed time interval. The control system will perform up to three consecutive reheat cycles. If three consecutive reheat cycles have been performed and if the fourth reheat time interval has elapsed, then instead of performing another reheat cycle, the control system sounds the alarm 97, turns on an internal timer and then monitors the start switch 15, but with no reheat cycles. The alarm can be turned off by activating the start switch 15 to its closed state.

The Abort Mode for the present apparatus can be initiated at anytime during the operating cycle by opening the abort switch 98. In the abort mode, the control system turns off the then activated lamps 65 or 67, turns off the alarm 97, if it is on, and raises the shield 14 if it is closed. It then selects the other bank of lamps, and also starts the internal timer (to be described later), and monitors the start switch 15. At this point, however, it will not allow the use of a reheat cycle, but instead will continue to monitor the start switch 15 until it is closed. Upon the closing of the start switch 15, the control system will perform a normal activation cycle or an extended activation cycle, depending on whether one or more minutes of time has elapsed on the internal timer.

The present apparatus is operable to perform an extended activation cycle of the lamps 65 and 67 which differs from the normal activation cycle in two respects. First both banks of lamps are used for the upper and the sole heating areas. Also, the upper and sole thumbwheel time 102 is extended by two seconds. A normal activation cycle becomes an extended activation cycle only if the "spare in" input in the I/O strip 73 is grounded. The "spare in" input is grounded usually by a jumper lead attached to it and the "spare out" output. The "spare out" output is grounded by the control system only if the internal timer has counted one minute or more. This timer is turned on during the abort mode and the reheat alarm. The timer is turned off as soon as the upper lamps are turned on. The timer has a maximum recording time of four minutes. In addition, one minute is subtracted from the time whenever an extended activation cycle is performed (see FIG. 12). If the spare in, spare out jumper is in place, then the control system can perform up to four consecutive extended activation cycles, depending on the amount of time the machine waited in the abort mode or how long it waited after the reheat alarm 97 went on.

What is claimed is:

1. In apparatus providing an enclosure closed at least at the sides, back, and bottom, and open at the front through which are moved shoe outsoles and lasted uppers having thermoplastic cement applied to the surfaces thereof to be united to form finished shoes, the cement being flash activated by heat prior to uniting the outsole and a lasted upper, the improvement which comprises: means for supporting within the enclosure an outsole and a lasted upper with the cemented surfaces in positions to receive flash activating heat; separate sources of flash activating heat adjacent the positions of the outsole and lasted upper on said supporting means; operator protective shield means movable relative to the open front of said enclosure for shielding the source of heat from view, said shielding means being movable between shielding and nonshielding positions; and control means operatively connected to said separate heat sources and said protective shielding means, said control means including operation sequencing circuits connected to said separate heat sources and to said shielding means, and microprocessor means for scanning said circuits for selecting the sequence of operations of said separate heat sources and said shielding means and activating first means establishing a time delay between the operation of said shielding means and said separate sources of heat and activating a second means establishing a time delay in the turn on of said separate sources of heat at different time periods and the simultaneous turn off thereof, wherby the operation of said shielding means into shielding position occurs prior to the turn on of the first of said separate sources of heat and operation of said shielding means out of shielding position following the turn off of both of said separate sources of heat.

2. The apparatus set forth in claim 1 wherein said improvement comprises a separate movable source of flash activation heat adjacent said support means for lasted uppers, said separate movable source of flash activation heat being movable into a position for the flash activation of cement of the breast portion of the lasted uppers.

3. The apparatus set forth in claim 1, wherein said microprocessor operates said second means establishing a time delay for effecting a predetermined sequence in the turn on operation of said separate sources of flash activation heat, whereby the heating of the cement on the outsoles follows the initial start for heating of the cement on the lasted uppers.

4. The apparatus set forth in claim 1, wherein said source of flash activation heat adjacent the position of said outsole is divided into side-by-side banks, said source of said flash activation heat adjacent the position of said lasted upper is divided into side-by-side banks, and said microprocessor means selectively operates one each of said outsole and lasted upper banks of flash activating heat at a time in said sequence.

5. In apparatus providing an enclosure closed at the sides, back, and bottom and open at the front to receive shoe outsoles and lasted uppers having thermoplastic cement applied to the surfaces thereof to be united to form finished shoes, the cement being flash activated by heat prior to uniting the outsole and a lasted upper, the improvement which comprises: a first bank of heat producing elements for activating thermoplastic cement applied to outsoles; a second bank of heat producing elements for activating thermoplastic cement applied to lasted uppers; a source of electric power connected to said first and second banks of heat producing elements; shield means operable in the open front of said enclosure between positions exposing said first and second banks of heat producing elements for permitting the loading and unloading of outsoles and lasted uppers and shielding said first and second banks of heat producing elements from view; and control means being connected between said banks of heat producing elements and said shield means and said source of electric power, said control means being operable to establish a time delay cycle of energizing said first and second banks of heat producing elements in sequence, and a time delayed relation between operation of said shield means into its shielding position and the established time delay cycle of energizing said first and second banks of heat producing elements, said established time delay cycle initially energizing said first and second banks of heat producing elements in predetermined sequence and subsequently terminating the energization thereof simultaneously.

6. The apparatus improvement as set forth in claim 5 wherein said control means includes an operator activated start switch for initiating the energization of said banks of heat producing elements, and a microprocessor means for monitoring said start switch and the position of said shield means.

7. The apparatus improvement as set forth in claim 5, wherein said control means includes operator adjusted timer means for selecting the time of energization for each of said first and second banks of heat producing elements, whereby one bank is energized longer than the other.

8. In apparatus providing an enclosure closed at the sides, back, and bottom and open at the front to receive shoe outsoles and lasted uppers having thermoplastic cement applied to the surfaces thereof to be united to form finished shoes, the cement being flash activated by heat prior to uniting the outsole and a lasted upper, the improvement which comprises: spaced heat producing lamps for effecting the activation of the cement on outsoles and lasted uppers placed in registration with the heat generated by said spaced lamps; shield means operable between positions opening and closing the open front of the enclosure; a source of energy for moving said shield means and for energizing said spaced lamps; and control means operably connected between said source of energy and said shield means and spaced lamps for effecting a normal sequence of closing said shield means in advance of energizing said spaced lamps and opening said shield means following deenergizing of said spaced lamps, said control means including timing means for measuring the period when said shield means is open, manually operable start means for effecting a normal sequence of closing said shield means and energizing of said spaced lamps, and means responsive to the timing out of the period when said shield means is open for automatically initiating the reclosing of said shield means and the energization of said spaced lamps, whereby the cement on the outsoles and lasted uppers is subjected to a subsequent cycle of heat activation.

9. The apparatus improvement set forth in claim 8, wherein said control means monitors said automatically repeated heat activating cycle and includes signal means operable to signify the conclusion of a series of heat activating cycles.

* * * * *